Aug. 4, 1959  B. R. CLAY ET AL  2,898,509
STATIC MAGNETIC FIELD MEANS FOR COLOR TELEVISION RECEIVERS
Filed June 26, 1958
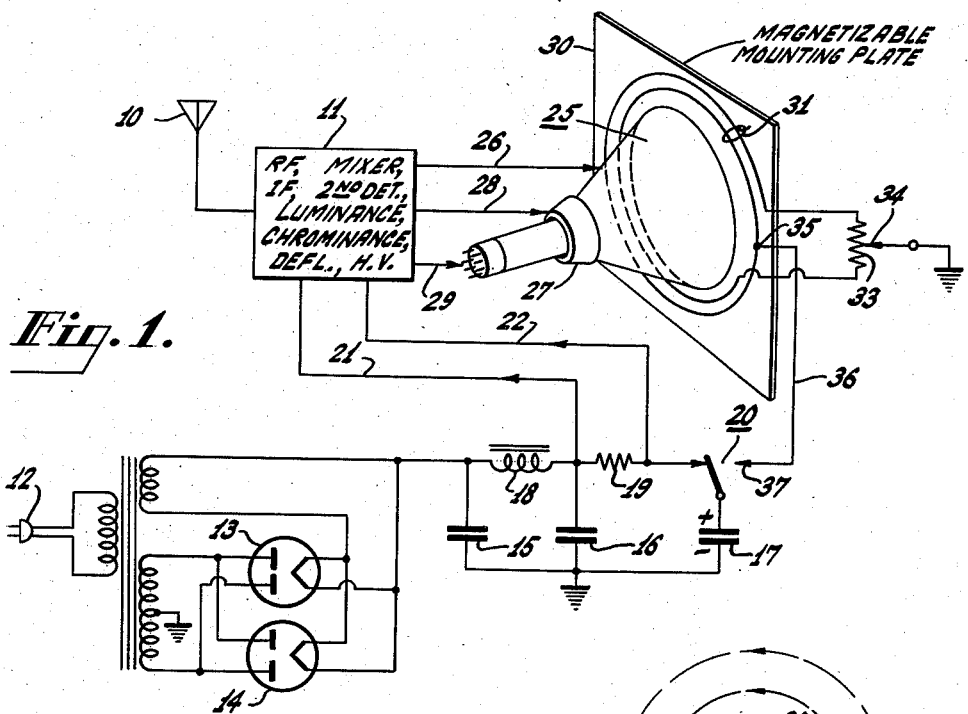
Fig. 1.
Fig. 2.
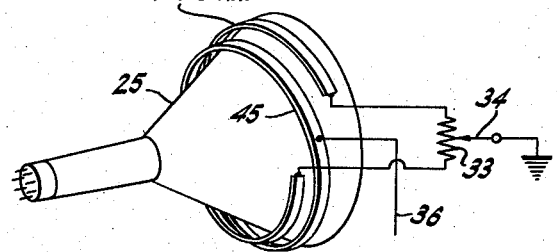
Fig. 3.
INVENTORS
BURTON R. CLAY &
LLOYD H. CARMEN
BY
ATTORNEY

United States Patent Office 2,898,509
Patented Aug. 4, 1959

2,898,509

STATIC MAGNETIC FIELD MEANS FOR COLOR TELEVISION RECEIVERS

Burton R. Clay, Woodbury, and Lloyd H. Carmen, Moorestown, N.J., assignors to Radio Corporation of America, a corporation of Delaware Application June 26, 1958, Serial No. 744,847

7 Claims. (Cl. 315—8)

This invention relates to means for establishing static, permanent magnetic fields in a cathode ray tube. The invention is particularly useful in combination with the color kinescope of a color television receiver.

The electron beam or beams in the color kinescope of a color television receiver must be very accurately controlled, both statically and dynamically. The earth's magnetic field, in passing through a color kinescope, tends to deflect the electron beams to an extent and in a direction depending upon the orientation of the color television receiver with respect to the direction of the earth's magnetic field. The earth's magnetic field may be considered as having three components: the Z-axis component in the direction of the longitudinal axis of the kinescope, and X and Y axis components at right angles to each other and transverse to the axis of the kinescope. It is necessary to provide static magnetic fields which cancel the three components of the earth's magnetic field. It is therefore necessary that these static canceling fields be readily adjustable so that the color receiver will operate properly after it is moved from one position to another in the viewer's home.

The shadow mask type of color kinescope also requires static magnetic fields for convergence, centering and color purity purposes.

In all cases where static magnetic fields are required in association with the kinescope, it is known to provide the static field by means of a direct current passed through a coil around a magnetic core. This method of providing static magnetic fields is impractical because of the great difficulty of maintaining the direct current through the coil at a constant desired value. It is also known to employ a permanent magnet adjustably mounted with respect to the color kinescope so that the effective magnetic field provided may be varied by varying the physical position of the permanent magnet with relation of the color kinescope. This method of providing a permanent, static magnetic field has been widely used commercially in color television receivers, but it suffers from the disadvantage that the movable magnetic elements are necessarily positioned so that they are relatively inaccessible to the person performing the adjustment, and because it is difficult for the person physically adjusting the magnets to observe the effects of his actions on the face of the kinescope.

It is therefore an object of this invention to provide improved means for establishing a static, permanent magnetic field of readily adjustable magnitude and direction in a cathode ray tube.

It is a further object to provide improved means for establishing static, permanent magnetic fields in a color kinescope by readily adjustable electric means not requiring electrical energy after the desired magnetic field is established.

It is a general object of this invention to provide means for greatly simplifying the adjustment of static permanent magnetic fields in a color kinescope.

In accordance with this invention, a magnetizable element is disposed with relation to a cathode ray tube, such as a color kinescope, to provide a magnetic field which influences the path of the electron beam or beams therein. A current path is provided in intimate association with the magnetizable element, and may be constituted by a coil of wire around the magnetizable element, or may be constituted by at least a portion of the magnetizable element itself. A storage capacitor is arranged to be charged to a predetermined potential. The storage capacitor may be a filter capacitor in the B+ power supply of the television receiver, or may be an independent capacitor charged from the B+ power supply of the receiver, or some other source. Potentiometer and momentary switch means are provided for discharging the storage capacitor through the current path with a magnitude of current determined by the position of the potentiometer. If the desired magnitude and direction of static permanent magnetic field is not established the first time the capacitor is discharged, as determined by viewing the face of the color kinescope, the potentiometer is repositioned and the capacitor is again discharged through the current path. The process is continued until the desired static magnetic field is established.

This and other objects and aspects of the invention will be apparent to those skilled in the art from the following more detailed description taken in conjunction with the appended drawings, wherein:

Figure 1 illustrates a color television receiver incorporating means for establishing a permanent static magnetic field of adjustable magnitude in the color kinescope of a color television receiver for the purpose of canceling the Z-axis component of the earth's magnetic field;

Figure 2 is a diagram illustrating certain magnetic fields in the color kinescope of Figure 1; and Figure 3 is a modified means for establishing a permanent magnetic field useful in the system of Figure 1, the magnetic field being established by passing a current through a magnetizable strap positioned around the color kinescope.

Referring to Figure 1, there is shown a color television receiver system incorporating one form of the present invention, for the purpose of neutralizing the Z-axis component of the earth's magnetic field within the color kinescope. The received television signal is applied by antenna 10 to the signal processing circuits 11 including, conventionally, a radio frequency amplifier, a mixer, an intermediate frequency amplifier, a second detector, luminance and chrominance video circuits, and deflection and high voltage circuits. The B+ power supply circuit is shown separately from the box 11, and is a conventional power supply including a plug 12 for connection to a source of alternating current, rectifiers 13 and 14, filter capacitors 15, 16 and 17, a filter choke 18, and a dropping resistor 19. The filter capacitor 17 is normally connected by means of switch 20 to the B+ power supply circuit. Two different values of B+ potential are supplied by means of leads 21 and 22 to the receiver circuits in box 11.

The color kinescope 25 of the color television receiver is supplied with ultor high voltage from the box 11 by lead 26. The deflection yoke 27 is supplied with deflection waveforms from box 11 by means of leads represented at 28. Signal waves and biasing potentials are supplied to the kinescope by leads represented at 29.

The color kinescope 25 is mounted in a cabinet (not shown) with the aid of a mounting plate 30 constructed of a magnetizable material such as ordinary sheet steel. The mounting plate 30 is apertured to receive and support the viewing end of the kinescope 25. A coil 31 consisting of a few turns of copper wire is positioned around the viewing end of a kinescope and in close proximity to the metallic mounting plate 30. To the two terminals of the coil 31 are connected the two terminals of a potentiometer 33 having a movable contact 34 which is connected to a point of reference potential such as ground. The center tap 35 of the coil 31 is connected by means of lead 36 to one fixed contact 37 of switch 20.

In the operation of the form of the invention shown in Figure 1, the effects of the Z-axis component of the earth's magnetic field is canceled by discharging the filter capacitor 17 through the coil 31 to permanently magnetize the mounting plate 30 to an extent and in a direction determined by the position of the movable contact 34 of the potentiometer 33. Switch 20 is shown in its normal position. The movable element of the switch 20 may be manually moved into momentary contact with the stationary contact 37. The charge on the capacitor 17 is discharged through a path including lead 36, the center tap 35 of the coil 31, the two paths from the center tap 35 to the terminals of the coil 31 and potentiometer 33, the movable contact 34 on the potentiometer 33, and back by the ground connection to the capacitor 17. It will be noted that if the movable contact 34 is in its uppermost position, practically all of the current discharged from the capacitor 17 flows to ground in the clockwise path from the center tap 35. On the other hand, when the movable contact 34 on potentiometer 33 is at its lowermost position, practically all of the current from the capacitor 17 flows to ground in the path going counter-clockwise from the center tap 35. It is thus apparent that the adjustable contact 34 permits the control of the net resultant direction of current in the coil 31, and thereby controls the direction of the static permanent magnetic field established in the mounting plate 30. It is also apparent that the position of the movable contact 34, when the capacitor is discharged, determines the net resultant magnitude of the magnetic field, between extreme limits of maximum magnetization in one direction and maximum magnetization in the opposite direction. The contact 34 is repositioned and the capacitor 17 is momentarily discharged as many times as is necessary to effect the desired permanent static field, as evidenced by observing the picture screen of the color kinescope 25.

All of the elements shown in Figure 1 of the drawings may be permanent integral parts of a commercial color television receiver. It will be noted that the only additional elements added for the purpose of accomplishing the results of this invention are the momentary switch 20, the coil 31, and the potentiometer 33. All other elements are essential parts of the receiver for other purposes. The filter capacitor 17 is utilized to perform a dual function.

Figure 2 illustrates the magnetic fields in the vicinity of the color kinescope 25 of Figure 1. The earth's magnetic field is represented by the vector 40, by way of example, since the direction relative to the kinescope 25 depends on the physical orientation of the color receiver. The earth's magnetic field has a component 41 along the Z-axis, or longitudinal axis, of the kinescope. It is an object of the invention to establish a canceling permanent, static magnetic field component 42 which cancels the component 41. This is accomplished by discharging capacitor 17 through the coil 31 to magnetize the mounting plate 30. The magnetism induced in the mounting plate 30 establishes magnetic lines of force illustrated by the circles, with arrow heads thereon indicating the direction of the lines of force. The circular lines of force in the kinescope are represented by the vector 42. The permanent magnetic field represented by the vector 42 is in a direction opposite to the Z-axis component 41 of the earth's magnetic field, and is established at a magnitude to exactly cancel the component 41.

Figure 3 illustrates a modification of the system of Figure 1 wherein the magnetizable mounting plate 30 and the coil 31 are replaced by a magnetizable strap 45. The strap 45 may be, for example, ordinary iron packaging strap employed for banding packages and crates for shipment. It has been found that material of this nature is characterized in sufficient conductivity to the current discharge from the capacitor 17, and is characterized in having magnetic properties such that it can be sufficiently permanently magnetized by the current flowing through the strap itself to counteract the effect of the earth's magnetic field in the Z-axis direction. In all other respects, the form of the invention illustrated in Figure 3 operates in the same manner as has been described in connection with Figures 1 and 2.

The arrangement of the invention, wherein permanent magnetic fields of adjustable amplitude are established by means of momentarily discharging a capacitor, has important advantages over prior art arrangements wherein a variable source of continuous direct current potential is applied to a magnetizing coil. In this prior art arrangement, the direct current source must be continuous and absolutely stable. Or, if the direct current is applied only during the adjustment period to establish permanent magnetism, the residual magnetism existing when the current is removed is at a lower unpredictable level than that existing during the application of current to the coil. By contrast, the capacitor discharging arrangement of the present invention provides an instantaneous indication of the amount of permanent magnetism established in the magnetized core. Therefore, the desired amount of permanent magnetism can be very rapidly and accurately established.

What is claimed is:

1. A color television receiver arrangement comprising the combination of: a cathode ray color image reproducing device, a permanently magnetizable element mounted to affect the path of the electron beam of said image reproducing device, a current path intimately associated with said magnetizable element to magnetize or demagnetize said element in response to current passed through said current path, a storage capacitor, means to charge said storage capacitor to a predetermined potential, and potentiometer and momentary switch means coupled from said capacitor to said current path to momentarily discharge said capacitor through said current path with a current magnitude determined by the position of said potentiometer, whereby a static permanent magnetic field of desired magnitude may be established in said magnetizable element.

2. A color television receiver arrangement comprising the combination of: a cathode ray color image reproducing device, a permanently magnetizable element mounted to affect the path of the electron beam of said image reproducing device, a current path intimately associated with said magnetizable element to magnetize or demagnetize said element in response to current passed through said current path, a storage capacitor, means to charge said storage capacitor to a predetermined potential, and potentiometer and momentary switch means coupled from said capacitor to said current path to momentarily discharge said capacitor through said current path with a current magnitude and direction determined by the position of said potentiometer, whereby a static permanent magnetic field of desired magnitude may be established in said magnetizable element.

3. A color television receiver arrangement comprising the combination of: a cathode ray color image reproducing device, a permanently magnetizable element mounted to affect the path of the electron beam of said image reproducing device, a current path intimately associated with said magnetizable element to magnetize or demagnetize said element in response to current passed through said current path, said current path being constituted by a coil of wire, a storage capacitor, means to charge said storage capacitor to a predetermined potential, and potentiometer and momentary switch means coupled from said capacitor to said current path to momentarily discharge said capacitor through said current path with a current magnitude and direction determined by the position of said potentiometer.

4. A color television receiver arrangement comprising the combination of: a cathode ray color image reproducing device, a permanently magnetizable element mounted to affect the path of the electron beam of said image reproducing device, a current path intimately associated with said magnetizable element to magnetize or demagnetize said element in response to current passed through said current path, said current path being constituted by at least a portion of said magnetizable element, a storage capacitor, means to charge said storage capacitor to a predetermined potential, and potentiometer and momentary contact switch means coupled from said capacitor to said current path to momentarily discharge said capacitor through said current path with a current magnitude and direction determined by the position of said potentiometer.

5. A color television receiver arrangement comprising the combination of: a cathode ray color kinescope, a permanently magnetizable mounting plate for said kinescope near the viewing end thereof, a coil associated with said mounting plate to permanently magnetize or demagnetize said plate in response to current passed through said coil, a B+ power supply including a filter capacitor, and potentiometer and momentary contact switch means coupled from said capacitor to said coil to momentarily discharge said capacitor through said coil with a current magnitude and direction determined by the position of said potentiometer, whereby said plate may be permanently magnetized to cancel the Z-axis component of the earth's magnetic field.

6. The combination of: a cathode ray tube, a permanently magnetizable element mounted on said cathode ray tube to provide a static magnetic field to affect the path of the electron beam of said tube, a current path intimately associated with said magnetizable element to magnetize or demagnetize said element in response to current passed through said current path, a storage capacitor, means to charge said storage capacitor to a predetermined potential, and potentiometer and momentary switch means coupled from said capacitor to said current path to momentarily discharge said capacitor through said current path with a current magnitude and direction determined by the position of said potentiometer.

7. The combination of: a cathode ray tube, a permanently magnetizable element mounted on said cathode ray tube to provide a static magnetic field to affect the path of the electron beam of said tube, a current path intimately associated with said magnetizable element to magnetize or demagnetize said element in response to current passed through said current path, said current path being provided with two end terminals and an intermediate terminal, a potentiometer having end terminals connected to the end terminals of said current path and having a movable intermediate terminal, a storage capacitor, means to charge said storage capacitor to a predetermined potential, and momentary switch means for momentarily connecting said capacitor in circuit with said two intermediate terminals to momentarily discharge said capacitor through said current path with an effective current magnitude and direction determined by the position of said potentiometer.

No references cited.